United States Patent [19]

Smith et al.

[11] Patent Number: 4,729,531

[45] Date of Patent: Mar. 8, 1988

[54] ALIGNMENT BRACKET FOR COAXIAL CABLES

[75] Inventors: Michael G. Smith, Chicago; Patrick C. Kearney, Arlington Heights; Gary A. Egger, Elgin, all of Ill.

[73] Assignee: Motorola, Inc., Schaumburg, Ill.

[21] Appl. No.: 20,413

[22] Filed: Mar. 2, 1987

[51] Int. Cl.[4] ............................................. F16L 3/22
[52] U.S. Cl. .................................. 248/68.1; 174/135; 248/73
[58] Field of Search .................... 248/68.1, 74.1, 74.4, 248/73; 174/65 R, 135; 339/103 M, 107

[56] References Cited

U.S. PATENT DOCUMENTS

| | | | |
|---|---|---|---|
| 2,560,486 | 7/1951 | Shears | 248/68.1 |
| 3,042,352 | 7/1962 | Stamper | 248/68.1 |
| 4,139,727 | 2/1979 | Kuballa | 174/135 X |
| 4,347,998 | 9/1982 | Loree | 248/68.1 |
| 4,431,152 | 2/1984 | Reed, Jr. | 248/68.1 X |
| 4,646,395 | 3/1987 | Mayszak | 248/68.1 X |

Primary Examiner—Ramon O. Ramirez
Attorney, Agent, or Firm—Rolland R. Hackbart

[57] ABSTRACT

A unique coaxial cable alignment bracket (102) reliably positions coaxial cables (140-142) extending from a backplane connector of a housing. One embodiment of the bracket (102) includes a substantially flat plate (152) and a U-shaped spring clip (172), both comprised of steel. Two feet (174 and 175) of the U-shaped spring clip (172) insert into corresponding slots (116 and 117) in the flat plate (152) for aligning and retaining the coaxial cables (140-142) in corresponding circular slots (108-110) in protruding portions of the flat plate (152). The unique bracket may be advantageously utilized in a variety of applications where heavy cables must be reliably positioned.

5 Claims, 12 Drawing Figures

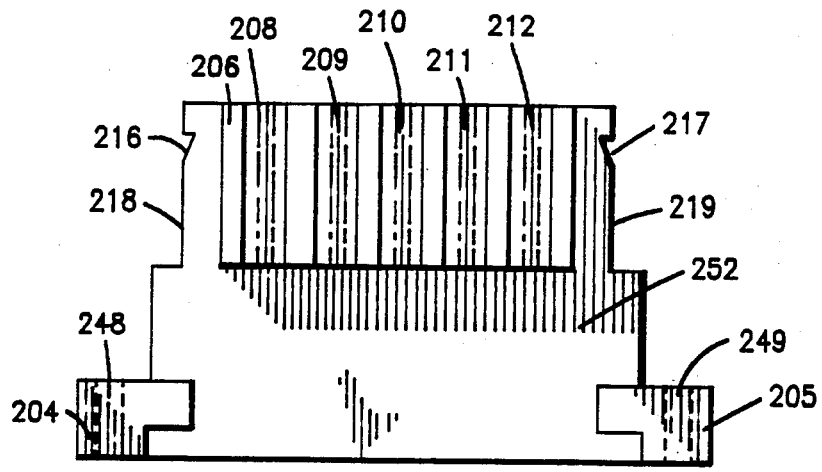
*FIG.7*
*FIG.8*
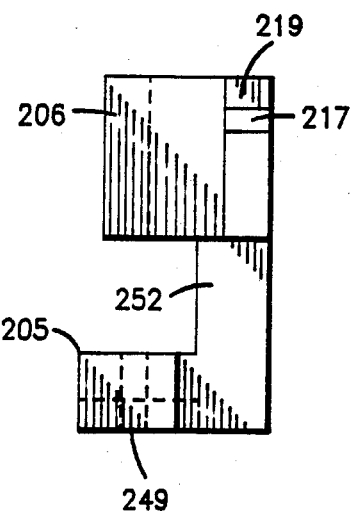
*FIG.9*
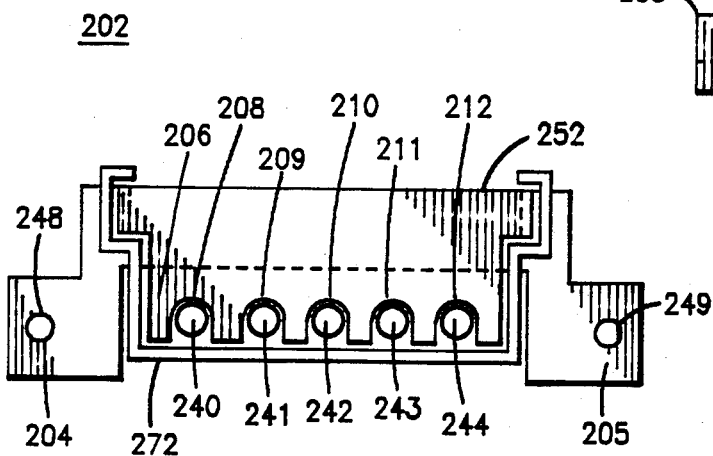

ALIGNMENT BRACKET FOR COAXIAL CABLES

BACKGROUND OF THE INVENTION

The present invention is generally related to coaxial cables and more particularly to an improved alignment bracket for aligning coaxial cables protruding from a housing.

In electrical systems, it is often necessary to couple high frequency signals, such as, for example, radio frequency signals, from one printed circuit board to another. Such printed circuit boards typically insert in backplane connectors of a housing. The high frequency signals may be coupled from one connector to another by coaxial cables. However, since coaxial cables are rigid and relatively inflexible, the coaxial cable connectors may easily become misaligned. Then when the printed circuit board is inserted, the misaligned coaxial cables become dislodged. Therefore, there is a need for apparatus which aligns and maintains alignment of the coaxial cables protruding from a housing.

SUMMARY OF THE INVENTION

Accordingly, it is an object of the present invention to provide an improved and inexpensive bracket for aligning coaxial cables protruding from a housing.

Briefly described, the present invention encompasses an alignment bracket for attaching to a housing and aligning a plurality of cables extending from the housing. The unique bracket comprises a substantially flat plate having near one end first and second protruding feet for attaching to the housing, said plate having near an end opposite said one end a protruding portion having at least first and second slots for receiving corresponding first and second cables, and said plate further having near opposites sides second and third slots; and a U-shaped spring clip having at opposite ends first and second protruding feet for inserting into the second and third slots of said plate, respectively, and retaining the first and second cables in the corresponding first and second slots.

BRIEF DESCRIPTION OF THE DRAWINGS

FIG. 7 is a front view of a plastic bracket embodying the present invention.

FIG. 8 is a side view of the bracket in FIG. 7.

FIG. 9 is a top view of the bracket in FIG. 7 and a U-shaped plastic clip for retaining three coaxial cables.

DESCRIPTION OF THE PREFERRED EMBODIMENT

Figure 1:
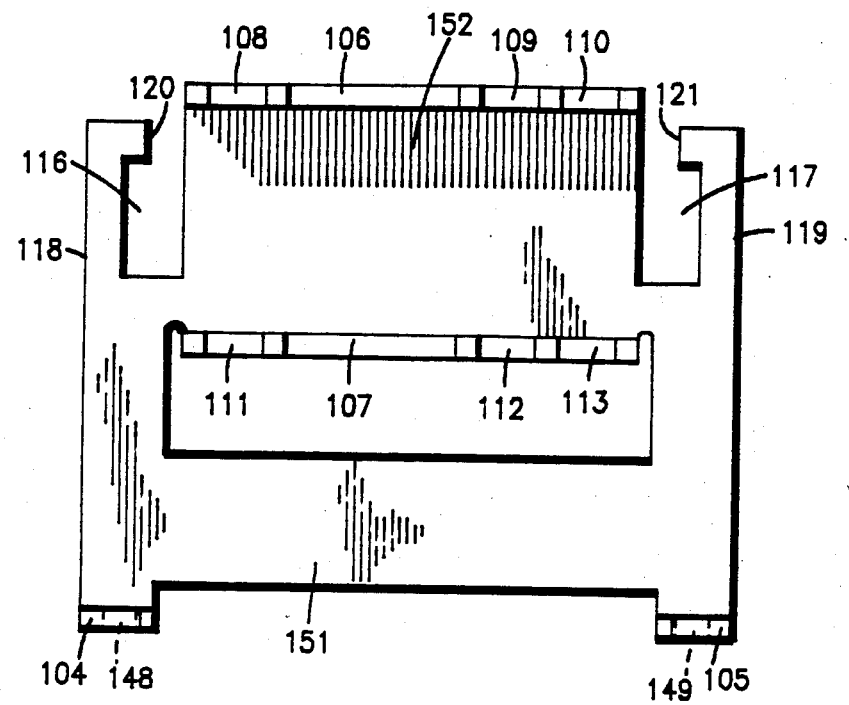
FIG. 1 is a front view of a bracket embodying the present invention.
Figure 2:
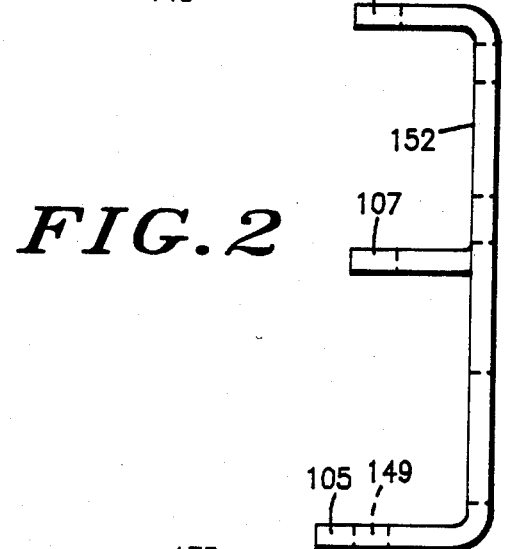
FIG. 2 is a side view of the bracket in FIG. 1.
Figure 3:
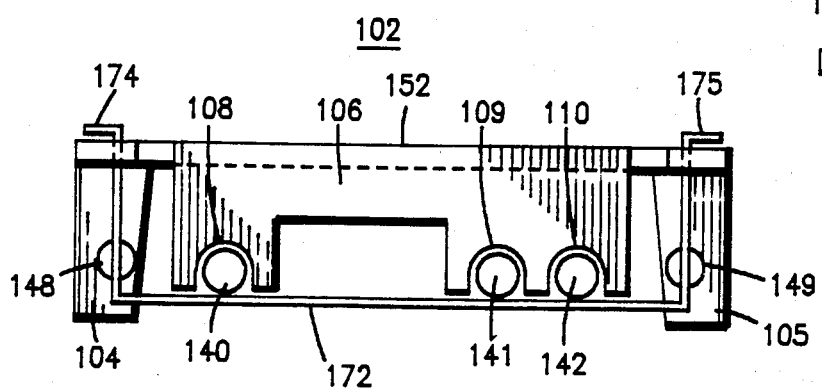
FIG. 3 is a top view of the bracket in FIG. 1 and a U-shaped spring clip for retaining three coaxial cables.

In FIGS. 1, 2 and 3, there is illustrated a front, side and top views, respectively, of a coaxial cable alignment bracket 102 embodying the present invention. Bracket 102 includes a substantially flat plate 152 and a U-shaped spring clip 172 for retaining three coaxial cables 140–142 which extend from a housing. For example, coaxial cables 140–142 may be coupled to a connector of a backplane (not shown) that mates with a corresponding connector on a pluggable printed circuit board (not shown). Although shown with only three coaxial cables 140–142, any practical number of coaxial cables or similar heavy cables may be retained by the bracket of the present invention. If coaxial cables 140–142 are not reliably positioned, cables 140–142 may be dislodged from their backplane connector when the printed circuit board is plugged in.

Plate 152 of bracket 102 in FIG. 1 has at one end two feet 104 and 105 and at the other end a protruding portion 106. Plate 152 is approximately 55 mm by 45.9 mm in size. Feet 104 and 105 may include mounting holes 148 and 149 for attaching bracket 102 to a backplane by means of screws and associated nuts. Protruding portion 106 includes slots 108–110 for receiving corresponding coaxial cables 140–142 shown in FIG. 3. A second protruding portion 107 including slots 111–113 may also be formed in the center of plate 152. Cross member 151 may be removed in other embodiments of bracket 102.

Plate 152 of bracket 102 in FIG. 1 also includes slots 116 and 117 near opposite sides 118 and 119 for receiving the feet 174 and 175, respectively, of the U-shaped spring clip 172 as shown in FIG. 3. Slots 116 and 117 have lips 120 and 121 for preventing corresponding feet 174 and 175 of the U-shaped spring clip 172 from slipping out of position. In other embodiments of plate 152, slots 116 and 117 may be suitably sized holes.

Referring to FIG. 2, there is illustrated a side view of bracket 102 in FIG. 1. Since bracket 102 is preferably made of cold rolled steel, protruding portions 106 and 107 and feet 104 and 105 may be implemented by bending portions of plate 152 outward. Protruding portions 106 and 107 extend approximately 10 mm, and feet 104 and 105 extend approximately 12.5 mm from plate 152.

Referring to FIG. 3, there is illustrated is a top view of plate 152 in FIG. 1. The shape of feet 104 and 105 and the position of holes 148 and 149 is more clearly shown in FIG. 2. Slots 108–110 are circular shaped for receiving corresponding cables 140–142. Additional slots may be provided in the gap between slots 108 and 109. Protruding portion 106 extends outward so that slots 108–110 are substantially aligned with holes 148 and 149. According to the present invention, feet 174 and 175 of U-shaped spring clip 172 insert into corresponding slots 116 and 117 for aligning and retaining cables 140–142 in corresponding slots 108–110.

Figure 4:
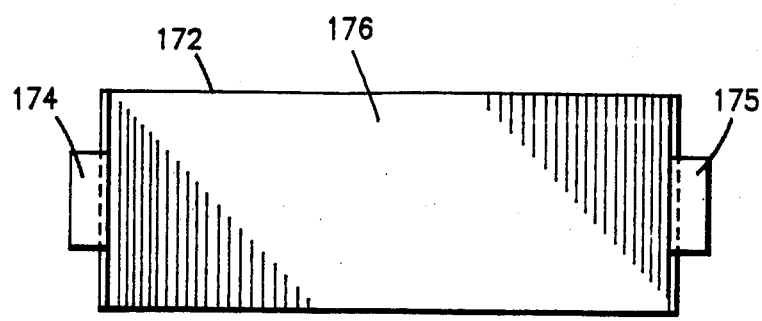
FIG. 4 is a front view of the U-shaped spring clip in FIG. 3.
Figure 5:
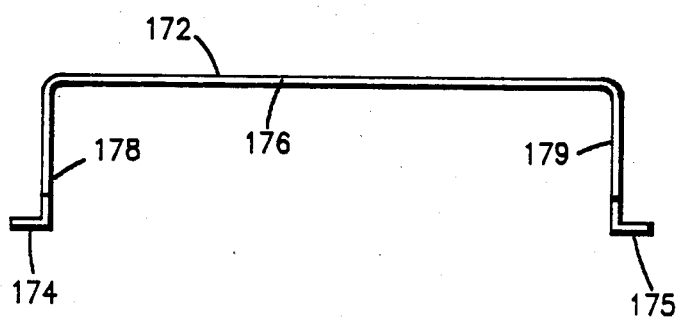
FIG. 5 is a top view of the U-shaped spring clip in FIG. 4.
Figure 6:
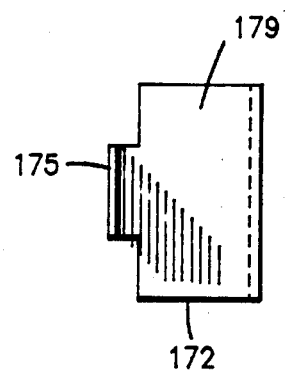
FIG. 6 is a side view of the U-shaped spring clip in FIG. 4.

Referring next to FIGS. 4, 5 and 6, there is illustrated front, top and side views of U-shaped spring clip 172. U-shaped spring clip 172 includes center portion 176, sides 178 and 179 and feet 174 and 175. Center portion 176 is approximately 48.7 mm by 22.9 mm, and sides 178 and 179 are approximately 12.7 mm by 22.9 mm in size. The center portion 176 of U-shaped spring clip 172 is preferably large enough to cover the gap between protruding portions 106 and 107 of plate 152. As can be seen from the side view in FIG. 6, sides 178 and 179 of U-shaped spring clip 172 are substantially the same size as center portion 176 and have on their free end corresponding feet 174 and 175. As can be seen from the top view in FIG. 5, sides 178 and 179 extend slightly outward for providing a spring force for retaining feet 174 and 175 in corresponding slots 116 and 117 of plate 152.

Referring now to FIGS. 7, 8 and 9, there is illustrated front, side and top views of another coaxial cable alignment bracket 202 embodying the present invention. In this embodiment, plate 252 and clip 272 are preferably comprised of Lexan plastic. By utilizing plastic, bracket 202 is cheaper to manufacture than bracket 102 in FIG. 1.

Plate 252 of bracket 202 in FIG. 7 has at one end two feet 204 and 205 and at the other end a protruding rectangular portion 206. Feet 204 and 205 may include mounting holes 248 and 249 for attaching bracket 202 to a backplane by means of screws and associated nuts. Protruding portion 206 includes slots 208–212 for receiving corresponding coaxial cables 240–244 shown in FIG. 9. Plate 252 also has indented sides 218 and 219 having slots 216 and 217 shaped to accept bosses 282 and 283, respectively, of U-shaped clip 276.

Referring to FIG. 8, there is illustrated a side view of bracket 202 in FIG. 7. Since bracket 202 is preferably made of plastic by injection molding, circular slots 208–212 may extend the entire length of solid protruding portion 206.

Referring to FIG. 9, there is illustrated a top view of plate 252 and clip 272. According to the present invention, U-shaped clip 272 slides over indented sides 218 and 219 and is held in place by bosses 282 and 283 which snap into corresponding slots 216 and 217 for aligning and retaining cables 240–244 in corresponding slots 208–212.

Figure 10:
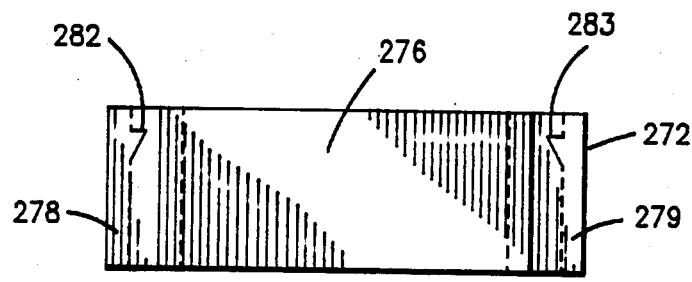
FIG. 10 is a front view of the U-shaped plastic clip in FIG. 9.
Figure 11:
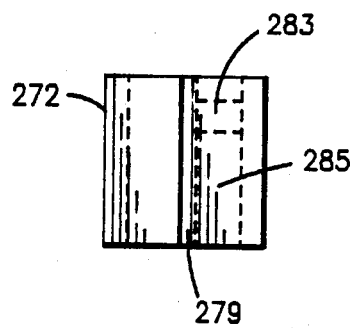
FIG. 11 is a side view of the U-shaped plastic clip in FIG. 10.
Figure 12:
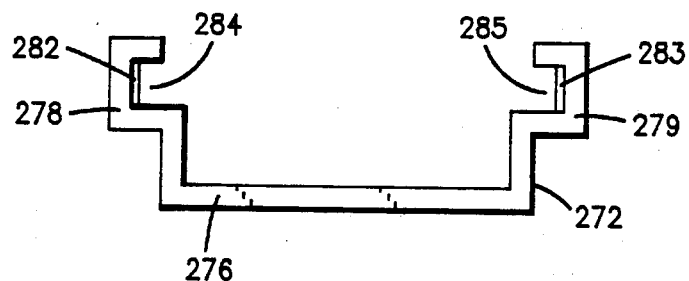
FIG. 12 is a top view of the U-shaped plastic clip in FIG. 10.

Referring next to FIGS. 10, 11 and 12, there is illustrated front, side and top views of U-shaped clip 272. U-shaped clip 272 includes center portion 276, sides 278 and 279 and rectangular channels 284 and 285. The center portion 276 of U-shaped clip 272 is preferably large enough to cover slots 208–212 of protruding portion 206 of plate 252. As can be seen from the front view in FIG. 10, sides 278 and 279 of U-shaped clip 272 include triangular shaped bosses 282 and 283, respectively. As can be seen from the side view in FIG. 11, boss 283 extends across channel 285 of side 279. As can be seen from the top view in FIG. 12, sides 278 and 279 form channels 284 and 285, respectively, which accept the corresponding sides 218 and 219 of plate 252. U-shaped clip 272 slides over indented sides 218 and 219 and is held in place by bosses 282 and 283 which snap into corresponding slots 216 and 217.

In summary, a unique coaxial cable alignment bracket has been described that may be advantageously utilized in electrical apparatus where a plurality of coaxial cables or other heavy cables must be reliably positioned. The alignment bracket of the present invention may be advantageously utilized in a variety of applications where it is necessary to reliably position a plurality of coaxial cables or other heavy cables. Therefore, while a particular embodiment of our invention has been shown and described, it should be understood that our invention is not limited thereto since other embodiments may be made by those skilled in the art without departing from the true spirit and scope of our invention. It is thus contemplated that our patent encompasses any and all such embodiments covered by the following claims.

We claim:

1. An alignment bracket for attaching to a housing and aligning a plurality of cables extending from the housing, said bracket comprising:

a substantially flat plate having near one end protruding first and second feet for attaching to the housing, said plate having near an end opposite said one end a first protruding portion having at least first and second slots for receiving corresponding first and second cables, said plate further having near opposites sides second and third slots, and said plate further having near said one end a second protruding portion having at least fourth and fifth slots for receiving the corresponding first and second cables; and a U-shaped spring clip having at opposite ends first and second protruding feet for inserting into the second and third slots of said plate, respectively, and retaining the first cable in the corresponding first and fourth slots and the second cable in the corresponding second and fifth slots.

2. The alignment bracket according to claim 1, wherein said plate and said clip are comprised of a metallic material.

3. The alignment bracket according to claim 1, wherein said first and second feet each include a mounting hole.

4. An alignment bracket for attaching to a housing and aligning a plurality of cables extending from the housing, said bracket comprising:

a substantially flat, plastic plate having near one end protruding first and second feet for attaching to the housing, said plate having near an end opposite said one end a protruding rectangular portion having at least first and second slots for receiving corresponding first and second cables, and said plate further having third and fourth slots on first and second sides, respectively; and a U-shaped plastic clip having at opposite ends first and second rectangular channels for accepting the corresponding first and second sides of said plate, said first and second rectangular channels including first and second bosses for inserting into the corresponding third and fourth slots, respectively, and retaining the first and second cables in the corresponding first and second slots.

5. The alignment bracket according to claim 4, wherein said first and second feet each include a mounting hole.

* * * * *